US012745134B2

(12) United States Patent
Zhang et al.

(10) Patent No.: US 12,745,134 B2
(45) Date of Patent: Sep. 22, 2026

(54) SYSTEMS AND METHODS FOR REFERENCE SIGNALING DESIGN AND CONFIGURATION

(71) Applicant: ZTE CORPORATION, Shenzhen (CN)

(72) Inventors: Shujuan Zhang, Shenzhen (CN); Zhaohua Lu, Shenzhen (CN); Bo Gao, Shenzhen (CN); Chuangxin Jiang, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 364 days.

(21) Appl. No.: 18/506,696

(22) Filed: Nov. 10, 2023

(65) Prior Publication Data

US 2024/0155433 A1 May 9, 2024

Related U.S. Application Data

(63) Continuation of application No. PCT/CN2021/109612, filed on Jul. 30, 2021.

(51) Int. Cl.
*H04W 28/06* (2009.01)
*H04W 28/16* (2009.01)
*H04W 36/00* (2009.01)

(52) U.S. Cl.
CPC ...... *H04W 28/16* (2013.01); *H04W 36/00838* (2023.05)

(58) Field of Classification Search
None
See application file for complete search history.

(56) References Cited

U.S. PATENT DOCUMENTS 11,647,532 B1 * 5/2023 Kaya ...................... H04B 7/088 370/329
12,250,576 B2 * 3/2025 Burghal ............... H04B 7/0617
2005/0176469 A1 * 8/2005 Stern-Berkowitz .......................... H04W 36/00835 455/562.1
2009/0318157 A1 * 12/2009 Hoshino ............. H04B 7/0452 455/450

(Continued)

FOREIGN PATENT DOCUMENTS

CN 109314628 A 2/2019
CN 110022195 A 7/2019

(Continued)

OTHER PUBLICATIONS

International Search Report and Written Opinion for PCT Appl. No. PCT/CN2021/109612, mailed Apr. 26, 2022 (8 pages).

(Continued)

*Primary Examiner* — Hassan A Phillips
*Assistant Examiner* — Gautam Sharma
(74) *Attorney, Agent, or Firm* — Foley & Lardner LLP

(57) ABSTRACT

Embodiments of a system, device and method for configuring reference signaling are disclosed. In some embodiments, a method includes determining, by a wireless communication device, N sets of parameters, determining, by the wireless communication device according to a layer 1 measurement, whether a condition of an event is satisfied, and identifying, by the wireless communication device according to the determination, M sets of parameters from the N sets of parameters. In some embodiments, N is a positive integer value. In some embodiments, M is smaller than or equal to N.

20 Claims, 11 Drawing Sheets

(56) References Cited

U.S. PATENT DOCUMENTS

| | | | | |
|---|---|---|---|---|
| 2015/0282122 | A1* | 10/2015 | Kim | H04B 7/088 370/329 |
| 2017/0295508 | A1* | 10/2017 | Stirling-Gallacher | H04L 5/0035 |
| 2018/0192426 | A1 | 7/2018 | Ryoo et al. | |
| 2019/0082334 | A1* | 3/2019 | Nagaraja | H04B 7/06964 |
| 2020/0322887 | A1* | 10/2020 | Pao | H04W 24/10 |
| 2021/0344402 | A1* | 11/2021 | Dalsgaard | H04W 76/19 |
| 2024/0155433 | A1* | 5/2024 | Zhang | H04W 72/542 |

FOREIGN PATENT DOCUMENTS

| | | | |
|---|---|---|---|
| CN | 111567081 | A | 8/2020 |
| CN | 111903069 | A | 11/2020 |
| CN | 112448744 | A | 3/2021 |
| WO | WO-2019/097478 | A1 | 5/2019 |
| WO | WO-2020/198977 | A1 | 10/2020 |

OTHER PUBLICATIONS

Extended European Search Report for EP Appl. No. 21951349.6, dated Jul. 25, 2024 (7 pages).

Huawei et al., “Remaining issues on PDCCH enhancements”, 3GPP TSG RAN WG1 #105-e, R1-2105928, May 27, 2021, e-Meeting (8 pages).

Nokia et al., “Enhancements for Multi-TRP URLLC schemes”, 3GPP TSG RAN WG1 #104-bis-e Meeting, R1-2103366, Apr. 20, 2021, e-Meeting (32 pages).

Communication pursuant to Article 94(3) EPC for EP Appl. No. 21951349.6, dated Oct. 21, 2025 (5 pages).

* cited by examiner

1100

1110 Transmit a signaling including N sets of parameters, to a wireless communication device, wherein N is a positive integer value

1200

1300

1310 Receive, from a wireless communication device, a second channel state information in a second message (msg) of a physical random access channel (PRACH) process

SYSTEMS AND METHODS FOR REFERENCE SIGNALING DESIGN AND CONFIGURATION

CROSS-REFERENCE TO RELATED APPLICATION

This application claims the benefit of priority under 35 U.S.C. § 120 as a continuation of PCT Patent Application No. PCT/CN2021/109612, filed on Jul. 30, 2021, the disclosure of which is incorporated herein by reference in its entirety.

TECHNICAL FIELD

The disclosure relates generally to wireless communications and, more particularly, to systems and methods for designing and configuring reference signaling.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Embodiments of a system, device and method for configuring reference signaling are disclosed. In some embodiments, a method includes determining, by a wireless communication device, N sets of parameters, determining, by the wireless communication device according to a layer 1 measurement, whether a condition of an event is satisfied, and identifying, by the wireless communication device according to the determination, M sets of parameters from the N sets of parameters. In some embodiments, N is a positive integer value. In some embodiments, M is smaller than or equal to N. In some embodiments, the N sets of parameters corresponds to one serving cell. In some embodiments, the method includes determining, by the wireless communication device, to maintain or to suspend a first set of parameters while the wireless communication device applies the M sets of parameters.

In some embodiments, a method includes transmitting, by a first wireless communication node, a signaling including N sets of parameters, to a wireless communication device, wherein N is a positive integer value. In some embodiments, the method includes determining, by a second wireless communication node, P sets of parameters and monitoring, by the second wireless communication node, a second transmission from the wireless communication device, according to the P sets of parameters. In some embodiments, the second wireless communication node is the same as or different from the first wireless communication node. In some embodiments, P is an integer smaller than or equal to N, or smaller than or equal to a predefined positive integer value M, wherein the N sets of parameters includes the P sets of parameters.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
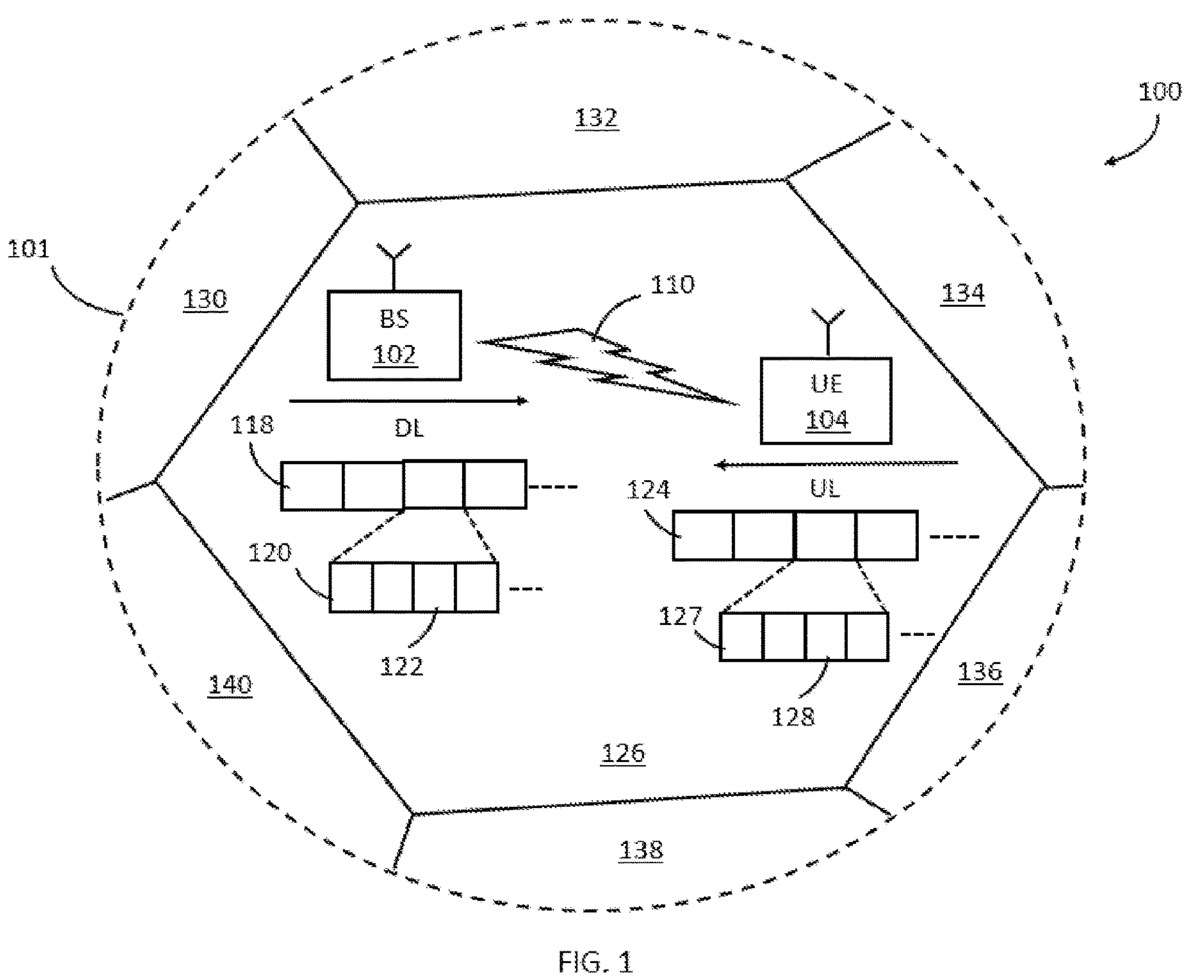
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
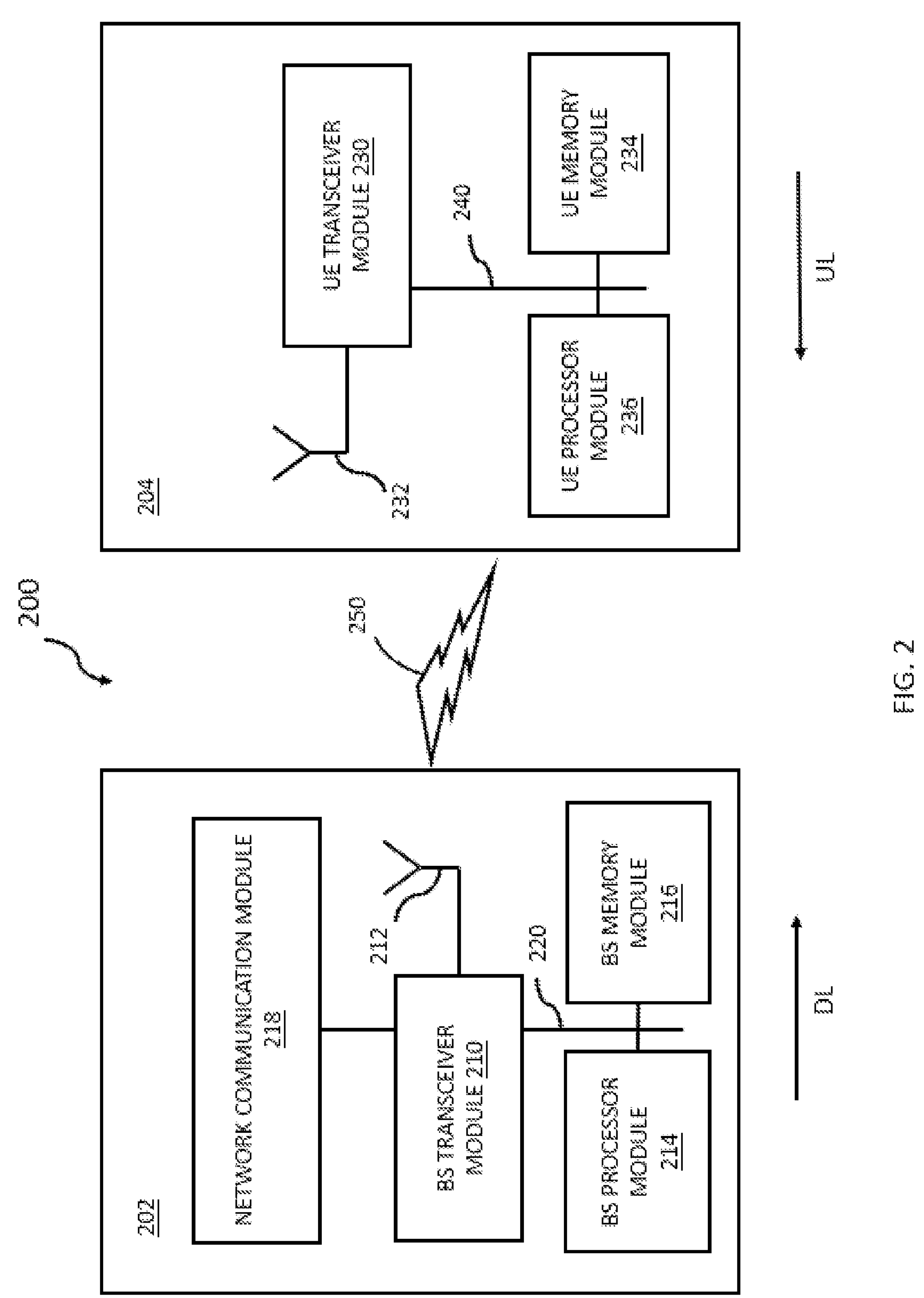
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Reference Signaling Design and Configuration

Disclosed herein are embodiments of a system, apparatus, computer readable medium, and method for speeding up handover, improving a success rate of handover, reporting a layer 1 (L1, e.g., physical layer) measurement in message3 (msg3) and/or msgB, and/or configuring a higher priority in providing/sending a channel state information (CSI) reporting to neighboring cell.

The 5G New Radio (NR) can support communication with small cells and beam transmissions. These two factors may lead to a higher frequency of handovers between cells. Current handovers between cells can be performed/configured/facilitated using radio resource control (RRC) signaling. In some embodiments, using current techniques, latency and overhead of handovers are larger than desired. In some embodiments, spectrum efficiency is lower in the case of handover. For all these reasons, in some embodiments, using current techniques, the RRC signaling may not be successfully transmitted to a user equipment (a UE, e.g., the UE 104, the UE 204, a mobile device, a wireless communication device, a terminal, etc.) and may lead to handover failures. In some aspects, this disclosure includes techniques to speed up handovers and/or to improve success rate of handovers.

Disclosed herein are embodiments of a system, apparatus, computer readable medium, and method for determining N sets of parameters; determining whether a condition of an event, based on layer 1 measurement, is satisfied; if the condition is satisfied, determining M sets of parameters from the N sets of parameters; and transmitting or receiving, in response to the condition being satisfied, according to the M sets of parameters. In some embodiments, the N sets of parameters correspond to one serving cell. In some embodiments, each of the N sets of parameters is associated with one of one bandwidth part (BWP), one control resource set (CORESET) pool, one transmission configuration indicator (TCI) state group, one reference signal group, one serving cell, one serving cell group, one supplementary link, one physical cell index (PCI), or a combination of the one PCI and one frequency information.

In some embodiments, the UE suspends or maintains an old (or prior, or first) set of parameters while the UE applies the M sets of parameters. In some embodiments, there is a relationship between the old set of parameters and the M sets of parameters. In some embodiments, whether to suspend or maintain the old set is determined/configured according to a signaling from a wireless communication node (e.g., gNB (Next Generation NodeB), a base station (BS), the BS 102, the BS 202, a wireless communication node, a cell, a cell tower, a radio access device, a transmit receive point (TRP), another UE, etc.) and/or UE capability. In some embodiments, the UE transmits a physical random-access channel (PRACH) according to the M sets of parameters. In some embodiments, there is a relationship between a time of applying the M sets of parameters and the PRACH. In some embodiments, the UE determines the N sets of parameters. In some embodiments, the UE determines the M sets of parameters. In some embodiments, there is a relationship between the N sets of parameters. In some embodiments, a set of the N sets of parameters includes certain parameters.

In some embodiments, the UE reports CSI in msg3 or msgB during the PRACH process. In some embodiments, the msg3 or msgB includes certain information. In some embodiments, the UE resolves a slot structure configuration when the UE applies more than one set of parameters. In some embodiments, there is a priority of CSI reporting according to PCI associated with a CSI reporting.

Figure 3:
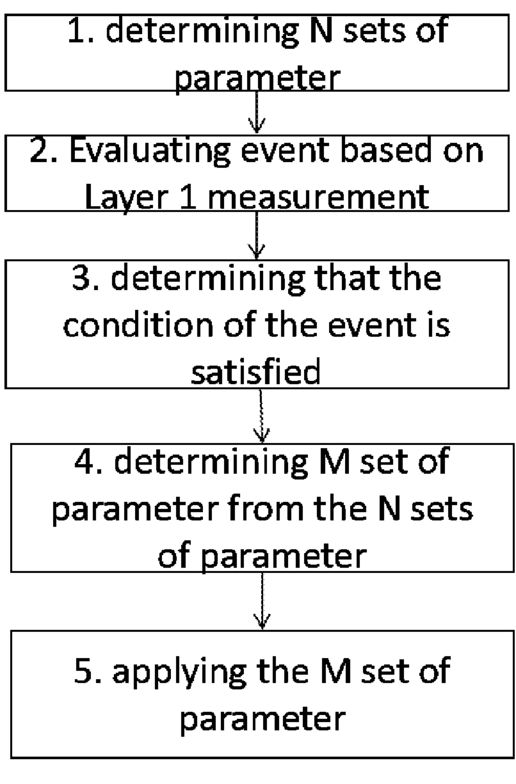
FIG. 3 illustrates a flowchart of a method for applying M sets of parameters, in accordance with some embodiments.

FIG. 3 illustrates a flowchart of a method for applying M sets of parameters, in accordance with some embodiments. As shown in FIG. 3, and in some embodiments, the UE determines N sets of parameters. In some embodiments, N is larger than or equal to 1. In some embodiments, the UE evaluates an event based on a Layer 1 (L1) measurement. In some embodiments, in response to a condition of the event being satisfied, the UE determines M sets of parameters from the N sets of parameters and applies the M sets of parameters. In some embodiments, M is larger than or equal to 1. In some embodiments, the UE applying the M sets of parameters indicates/means that the UE performs transmitting and/or receiving according to the M sets of parameters.

In some implementations, the L1 measurement includes a physical (PHY) layer measurement. For example, in some embodiments, the L1 measurement includes at least one of an L1-reference signal received power (RSRP), an L1-reference signal received quality (RSRQ), an L1-signal-to-interference ratio (SINR), or a block error rate (BLER) of a physical downlink control channel (PDCCH).

In some implementations, the N sets of parameters correspond to one serving cell. Further, the serving cell can be a primary cell or a special cell which includes a primary cell or a secondary primary cell in a second cell group. In some implementations, each of the N sets of parameters is associated with one of a BWP, one CORESET pool, one TCI state group, one reference signal group, one serving cell, one serving cell group, one supplementary link, one physical cell index (PCI), or one combination of the one PCI and one piece (e.g., portion, section, range, etc.) of frequency information, one combination of the one PCI, one piece of frequency information and one piece of sub-carrier spacing. One serving cell can be configured with one or more supplementary links. In some embodiments, the supplementary link includes at least one of a supplementary downlink or a supplementary multiple link. For example, in some embodiments, each of the N sets of parameters is associated with one BWP. In some embodiments, the N sets of parameters correspond to N BWPs in total (e.g., each of the N sets of the parameters corresponds to a respective one of the N BWPs). The N BWPs may be in one serving cell.

In some implementations, the UE suspends (or deactivates/ignores/bypasses) the old set of parameters (e.g., a first set of parameters) and applies the M sets of parameters. For example, the old set and the M set can include a PDCCH configuration. In some embodiments, the UE may not monitor a PDCCH configured in the old set and may (only) monitor PDCCH configured in the M sets of parameters. In some embodiments, the UE switches the set of parameters from the old set of parameters to the M sets of parameters. For example, in some embodiments, each of the N sets of parameters is associated with one BWP and the old set of parameters also corresponds to one BWP. In some embodiments, in response to a condition being satisfied, the UE switches from an old BWP to a new BWP associated with the M sets of parameters. In another example, each of the N sets of parameters is associated with one CORESET pool in one BWP and the old set of parameters also corresponds to one CORESET pool in the one BWP. In some embodiments, in response to a condition being satisfied, the UE switches from an old CORESET pool to a new CORESET pool associated with the M sets of parameters.

In some implementations, the UE not only applies the M sets of parameter, and can also apply the old set of parameters. The UE maintains two links for example. The M sets of parameters corresponds to a new link associated with a new transmission point. In some embodiments, the old set of parameters corresponds to an old link associated with an old transmission point. In some embodiments, the UE determines to suspend the old set(s) of parameters or can maintain the old set of parameters according to at least one of UE capability reported to the gNB or signaling from the gNB or another UE.

In some implementations, a first type of parameter of the two types of sets is same, wherein the two types of sets include the old set of parameters and the M sets of parameters. In some embodiments, the first type of sets of parameters includes the old set of parameters. In some embodiments, the second type of sets of parameters includes the M sets of parameters. In some embodiments, when M is 1, the two types of sets of parameters can be referred as two sets of parameters. For example, in some embodiments, the first type of a parameter shared (or that is the same) between the two types of sets of parameter includes at least one of the following parameters: CSI reporting or slot structure. The second type of parameter respectively configured for each of the two types of sets of parameter includes at least one of following parameters: a parameter of a synchronization signal, a TCI state list, a spatial relationship list, or a power control parameter.

Figure 4:
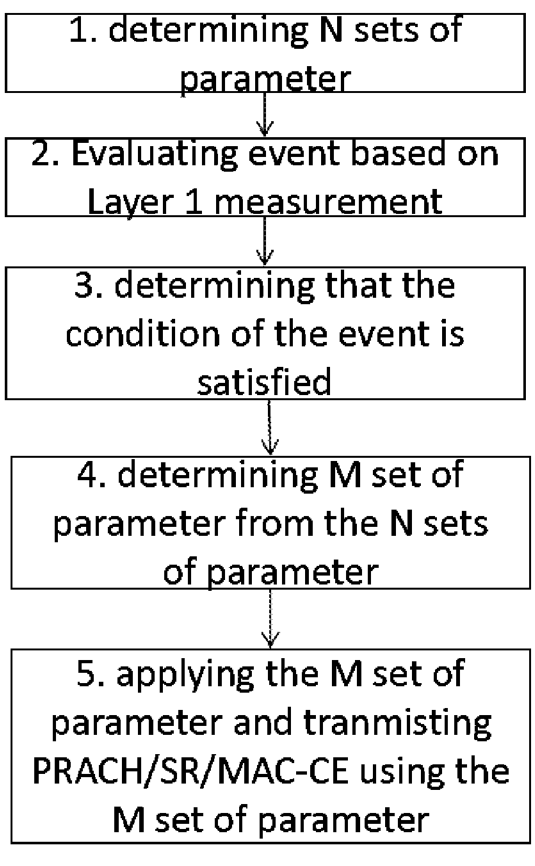
FIG. 4 illustrates a flowchart of a method for applying M sets of parameters and transmitting a second transmission, in accordance with some embodiments.

FIG. 4 illustrates a flowchart of a method for applying M sets of parameters and transmitting a second transmission, in accordance with some embodiments. In some implementations, in response to a condition of an event being satisfied/met, the UE determines M sets of parameters from the N sets of parameters and applies the M sets of parameters. In some embodiments, M is larger than or equal to 1. As shown in FIG. 4, in some embodiments, the UE transmits one or more of a PRACH, a scheduling request (SR), or a medium access control-control element (MAC-CE) (e.g., the second transmission). In some embodiments, the MAC-CE includes information of the determined M sets of parameters. For example, in some embodiments, the MAC-CE includes a selection/indication corresponding to the M sets of parameters from the N sets of parameters. In some implementations, the M sets of parameters includes a cell-radio network temporary identifier (C-RNTI) and a PRACH configuration. In some implementations, the UE transmits the PRACH/SR/MAC-CE (e.g., performing a second transmission) according to the C-RNTI and the PRACH configuration in the M sets of parameters.

As shown in FIG. 4, and in some implementations, the UE applies the determined M sets of parameters (e.g., performing a first transmission or reception) in response to the condition of the event being satisfied. In some implementations, the UE applies the determined M sets of parameters before receiving the response from the gNB.

Figure 5:
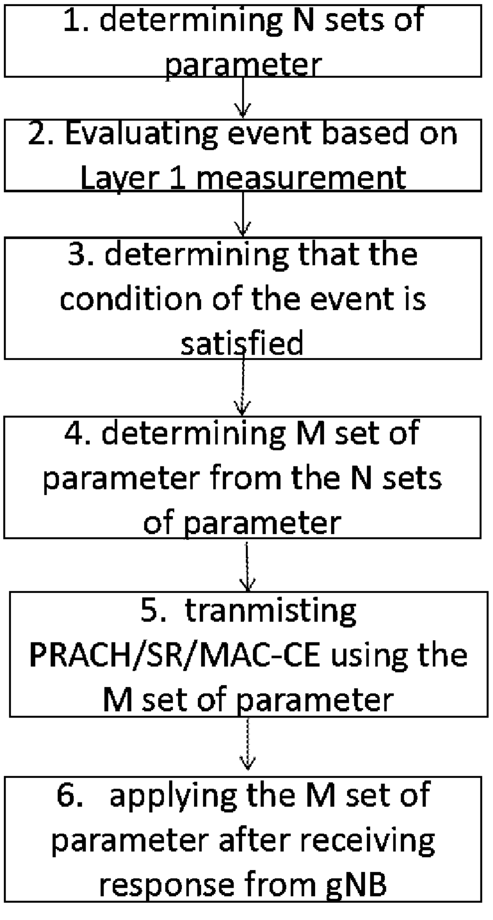
FIG. 5 illustrates a flowchart of a method for applying M sets of parameters after receiving a response from the gNB, in accordance with some embodiments.

FIG. 5 illustrates a flowchart of a method for applying M sets of parameters after receiving a response from the gNB, in accordance with some embodiments. In some implementations, in response to the condition of the event being satisfied, the UE transmits the PRACH/SR/MAC-CE according to the determined M sets of parameters. In some embodiments, the UE applies the M sets of parameters after the UE receives a response to/for the PRACH/SR/MACC-CE from the gNB, as shown in FIG. 5.

Figure 6:
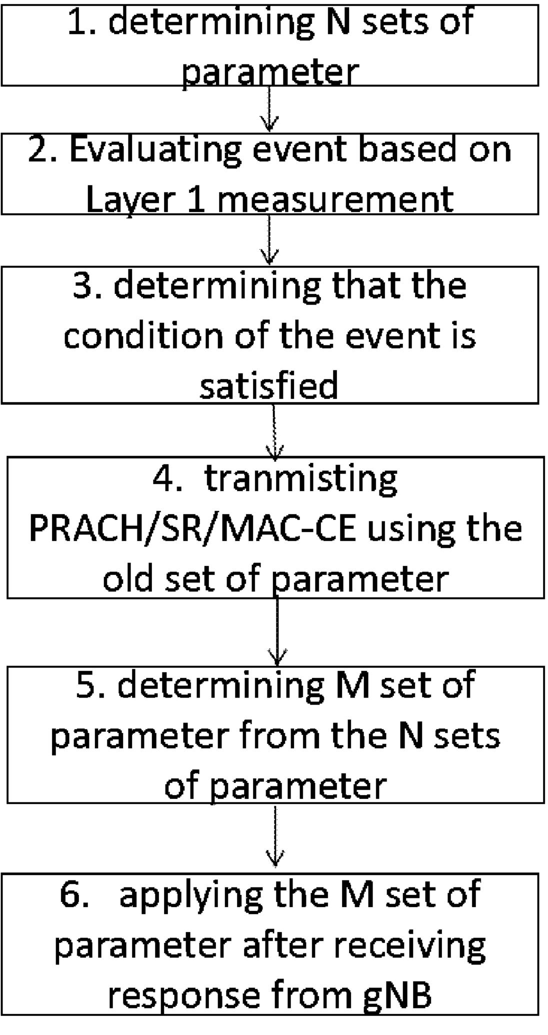
FIG. 6 illustrates a flowchart of a method for transmitting information using an old set of parameters and determining and applying M sets of parameters after receiving a response from the gNB, in accordance with some embodiments.

FIG. 6 illustrates a flowchart of a method for transmitting information using an old (or prior, or first) set of parameters and determining and applying M sets of parameters after receiving a response from the gNB, in accordance with some embodiments. In some implementations, in response to the condition of the event being satisfied/met, the UE transmits the PRACH/SR/MAC-CE using the old set of parameters and applies the M sets of parameters after the UE receives a response for the SR/MAC-CE, as shown in FIG. 6. The response can include the indication/selection of the M sets of parameters from the N sets of parameters. For example, in some embodiments, the PDCCH transmitted by the gNB includes the selection/indication corresponding to the M sets of parameters from the N sets of parameters. In some embodiments, the UE determines the M sets of parameters from the N sets of parameters according to a received indication from the gNB, as shown in FIG. 6. In some implementations, the M sets of parameters can be selected by the UE without selection/indication information from the gNB. Thus, transmitting the PRACH/SR/MAC-CE using the old set of parameters and determining M sets of parameters from the N sets of parameters can be done simultaneously at the UE side. In some implementations, the UE may apply a first portion of parameters in the M sets of parameters before receiving a response from the gNB, or before transmitting PRACH/SR/MAC-CE. In some embodiments, the UE applies a second portion of parameters in the M sets of parameters after receiving the response from the gNB. In FIGS. 4-6, the SR can be a dedicated SR for this purpose. In some embodiments, the UE transmits the SR in response to the condition of the event being satisfied. The MAC-CE may include at least one of measurements reporting, a selection corresponding to the M sets of parameters from the N sets of parameters, or information which indicates that the condition of the event is satisfied. In some embodiments, each of the measurements reporting corresponds to one or more sets of the N sets of parameters. For example, in some embodiments, each of the measurements reporting corresponds to one of the M sets of parameters. The MAC-CE can be included in msg3 or msgB during PRACH access. A parameter of a physical uplink shared channel (PUSCH) including the MAC-CE can be obtained/determined based on the M sets of parameters or the old set of parameters.

The UE can determine the N sets of parameters according to at least one of a number of methods. In some embodiments of a first method, the UE receives a first signaling (e.g., RRC signaling). In some embodiments, the first signaling includes a configuration of X sets of parameters. In some embodiments, the UE receives second signaling (e.g., a MAC-CE). In some embodiments, the second signaling includes an indicator of the N sets of parameters selected from X sets of parameters. The first signaling and the second signaling both are transmitted by the gNB. For example, in some embodiments, the second signaling includes (a) an index of the N sets of parameters or (b) a bitmap with X bits indicating the N sets of parameters. In some embodiments, the first signaling includes RRC signaling and the second signaling includes a MAC-CE. Additionally or alternatively, the first signaling includes MAC-CE and the second signaling includes DCI. The first signaling and the second signaling can be other signaling while remaining within the scope of the disclosure. In some embodiments, the applied delay of the first signaling is larger than the applied delay of the second signaling.

Figure 7:
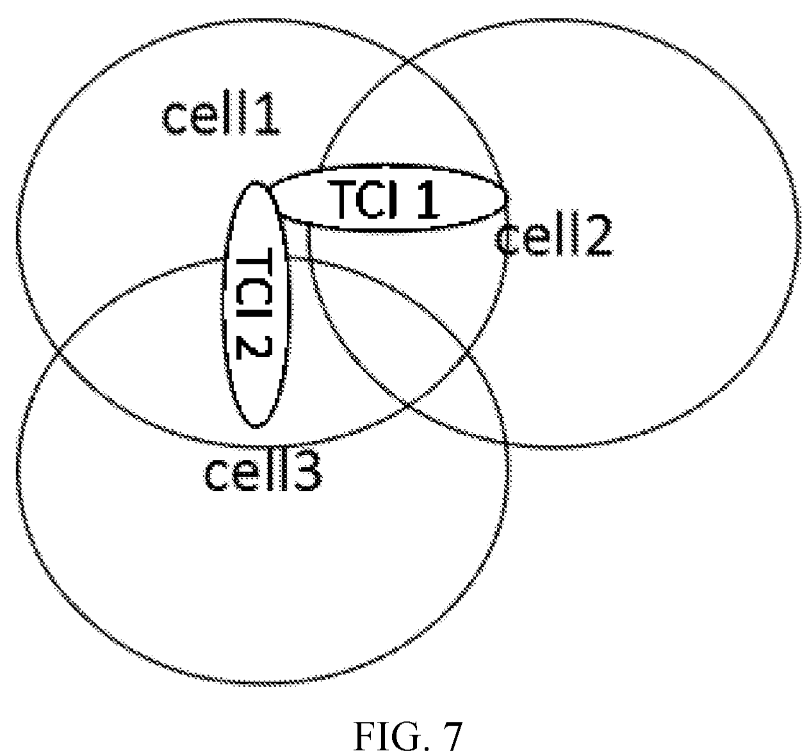
FIG. 7 illustrates determining N sets of parameters according to beam such as a TCI state/spatial relationship, different beams corresponding to different sets of neighboring cells, in accordance with some embodiments.

FIG. 7 illustrates determining N sets of parameters according to beam such as a TCI state/spatial relationship, different beams corresponding to different sets of neighboring cells, in accordance with some embodiments. In some embodiments of a second method, the UE determines the N sets of parameters according to an activated TCI state of physical downlink shared channel (PDSCH)/PDCCH. (In this document, A/B can mean A and/or B.) As shown in FIG. 7, and in some embodiments, each set of the N sets of parameters corresponds to one set of neighboring cells. In some embodiments, the UE is located in cell1. If the UE is located in a different place/portion/location of the cell1, the corresponding/resulting set of neighboring cells may be different. In some embodiments, a different beam group corresponds to a different set of neighboring cells. The beam group can be determined by the activated TCI state of PDSCH/PDCCH. In some embodiments, the TCI state 1 corresponds to a neighboring cell2. In some embodiments, the TCI state 2 corresponds to cell3, as shown in FIG. 7. In some embodiments, the N sets of parameters is determined by the UE according to the activated TCI state of PDSCH/PDCCH. In some embodiments, if the number of activated TCI states of the PDSCH/PDCCH is larger than 1, the N sets of parameters can include sets of parameters associated with any one activated TCI state.

In some implementations, the N sets of parameters include sets of parameters associated with one activated TCI state from the multiple activated TCI states. The one activated TCI state may be associated with a predefined feature. For example, in some embodiments, the one activated TCI state is associated with a lowest TCI state index among the multiple activated TCI states, or the one activated TCI state is the activated TCI state for a special CORESET.

In some implementations, the N sets of parameters include sets of parameters associated with all of the multiple activated TCI states, e.g., the N sets of parameters includes sets of parameters associated with each of the multiple activated TCI states. In some embodiments, the N sets of parameters include an intersection of sets of parameters associated with any one of the multiple activated TCI states. In some embodiments, the UE determines a corresponding relationship between the TCI state and sets of parameters according to received signaling from the gNB or predefined rule.

In some embodiments of a third method, the UE obtains/receives/gets/determines/identifies the N sets of parameter according to a spatial relationship for an uplink channel or signal. A different UE transmitting beam may correspond to a different neighboring cell. In some embodiments, the UE transmitting beam is indicated by the spatial relationship information for the uplink channel or signal. In some embodiments, the spatial relationship information includes a down/downlink reference signal or an uplink measurement signal, such as a sounding reference signal (SRS). In some embodiments, a transmitting file of the uplink channel or signal is obtained according to a receiving file of the down/downlink reference signal or a transmitting filter of the SRS.

In some embodiments of a fourth method, the UE obtains the N sets of parameters according to information reported by the UE. In some embodiments, the information reported by the UE includes a CSI report and/or the selection of N sets of parameters from X sets of parameters. In some embodiments, the CSI report includes measurement results based on M measurement reference signal resource groups. In some embodiments, each of the M measurement reference signal resource groups corresponds to one of the M sets of parameters. In some implementations, the CSI report includes measurement results based on N measurement reference signal resource groups. In some embodiments, each of the N measurement reference signal resource groups corresponds to one of the N sets of parameters. For example, in some embodiments, there are X measurement reference signal groups. In some embodiments, the UE selects N groups from the X groups. In some embodiments, the UE reports the indexes of the N measurement reference signal groups. In some embodiments, the UE determines the N sets of parameters according to a corresponding relationship between a measurement reference signal group and a set of parameters (e.g., a relationship between each of the measurement reference signal groups and a respective one of the sets of parameters). One measurement reference signal group can correspond to one set or multiple sets of parameters. The N sets of parameters can be associated with one or more measurement reference signal groups. The N sets of parameters can be obtained according to the one or more measurement reference signal groups. For example, in some embodiments, each of measurement reference signal groups corresponds to one PCI. In some embodiments, the UE reports the selected PCI. In some embodiments, the UE obtains the N sets of parameters according to the reported PCI.

Figure 8:
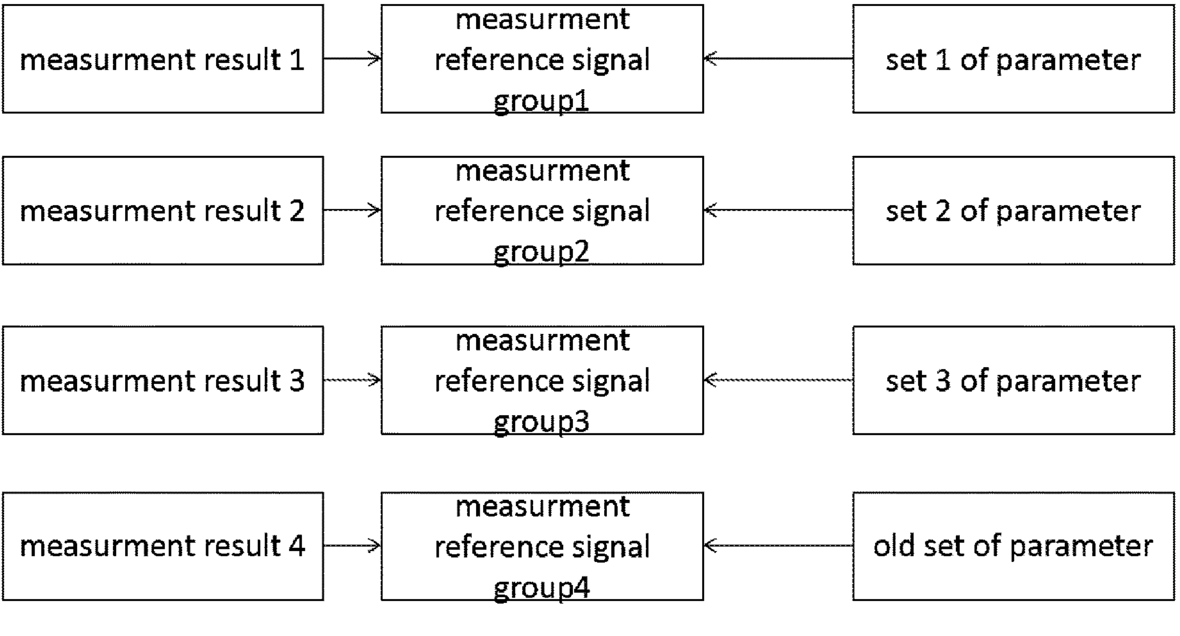
FIG. 8 illustrates that each measurement reference signal group corresponds to one Layer 1 measurement result and one set of parameters, in accordance with some embodiments.

FIG. 8 illustrates that each measurement reference signal group corresponds to one Layer 1 measurement result and one set of parameters in accordance with some embodiments. The UE determines the M sets of parameters according to at least one of a number of methods. In some embodiments of a first method, the UE determines the M sets of parameters according to a Layer 1 measurement result. In some embodiments, the Layer 1 measurement result is based on N measurement reference signal groups. In some embodiments, the Layer 1 measurements result of each of the M measurement reference signal group is higher than a threshold or higher than measurements results of one measurement reference signal group corresponding to the old/prior/first set of parameters. As shown in FIG. 8, and in some embodiments, each measurement reference signal group corresponds to one Layer 1 measurement result and one set of parameters. As shown in FIG. 8, in some embodiments, the N sets of parameters can include sets 1-3. In some embodiments, the UE obtains that measurement result of the measurement reference signal group1 that is higher than the threshold or higher than measurement results of measurement reference signal group 4 corresponding to the old set of parameters. In some embodiments, the UE determines that the M sets of parameters include set 1 of parameters. In some implementations, the UE further reports the measurement result of the measurement reference signal group 1. In some implementations, the UE determines that the M sets of parameter include the set 1 of parameters. In some embodiments, the set 1 of parameters is associated with the reported measurement result.

In some embodiments of a second method, the UE obtains the M sets of parameters according to signaling from the gNB. For example, as shown in FIG. 6, in some embodiments, the UE transmits the PRACH/SR/MAC-CE (e.g., the signaling) in response to the condition of the event being satisfied. In some embodiments, after the gNB receives the PRACH/SR/MAC-CE, the gNB transmits the signaling including a selection of the M sets of parameters from the N sets of parameters. In some embodiments, the UE determines the M sets of parameters according to the signaling from the gNB.

In some embodiments, the condition of the event includes one of (1) a layer 1 measurement result of M measurement reference signal groups becoming (e.g., is/being) better than (e.g., greater than or less than) a layer 1 measurement result of measurement reference signal groups (e.g., a first measurement reference signal group) associated with the old set of parameter, (2) a layer 1 measurement result of measurement reference signal groups associated with the old set of parameters becoming (e.g., is/being) worse than (e.g., greater than or less than) the threshold1 and a layer 1 measurement result of M measurement reference signal groups becoming (e.g., is/being) better than (e.g., greater than or less than) the threshold2, wherein M is larger than 1, (3) a layer 1 measurement result of M measurement reference signal groups becoming better than (e.g., greater than or less than) the threshold2, wherein M is larger than 1, or (4) a condition indicating an expiration of a timer. In some embodiments, the M measurement reference signal groups correspond to the M sets of parameters.

In some implementations, if the measurement reference signal group includes more than one measurement reference signal, the measurement result of the measurement reference signal group includes an average measurement result among all measurement result of all measurement reference signals in the measurement reference signal group, a worst measurement result among all measurement result of all measurement reference signals in the measurement reference signal group, or a best measurement result among all measurement result of all measurement reference signals in the measurement reference signal group. In some implementations, the measurement result includes at least one of an L1-RSRP, an L1-SINR, or an L1-RSRQ.

In some implementations, the N sets of parameters and/or the old set of parameters includes at least one of a same type of parameter. For example, in some embodiments, each of the N sets of parameters includes a configuration or a value of a synchronization signal. In some embodiments, each of the N sets of parameters includes a configuration or a value of a slot structure. In some embodiments, the slot structure includes a type of each orthogonal frequency-division multiplexing (OFDM) in a slot. In some embodiments, the type of OFDM includes one of a downlink (type), an uplink (type), or a flexible (type).

In some implementations, different sets of the N sets of parameters include different types of parameters. For example, in some embodiments, one set of the N sets includes a configuration or a value of a third type parameter, another set of the N set includes a configuration or a value of a fourth type parameter and does not include the configuration or the value of the third type parameter. In some embodiments, the third type parameter and the fourth type parameter are different parameters.

In some implementations, any one of the N sets of parameters and the old set of parameters includes one or more of the following parameters: a parameter of synchronization signal, a parameter of slot structure, a physical cell index, a frequency resource parameter of a carrier, a demodulation reference signal (DMRS) parameter, a measurement reference signal parameter, a rate mating parameter, a sub-carrier space, a power control parameter, a PDCCH configuration, a PDSCH configuration, a physical uplink control channel (PUCCH) configuration, a TCI state configuration, a spatial relation configuration, a PRACH configuration, a C-RNTI configuration, a Long Term Evolution (LTE) cell-specific reference signal (CRS) configuration, a timing advance (TA) parameter, a frequency resource parameter corresponding to the one set of parameters a time resource parameter corresponding to the one set of parameters a path loss reference parameter, a BWP parameter, a beam failure parameter, a system information block (SIB) configuration, a parameter of common control information, or a hybrid automatic request (HARQ) feedback parameter.

In some embodiments, the UE applying the M sets of parameters indicates that the UE transmits or receives signal/channel according to the M sets of parameters.

Figure 9:
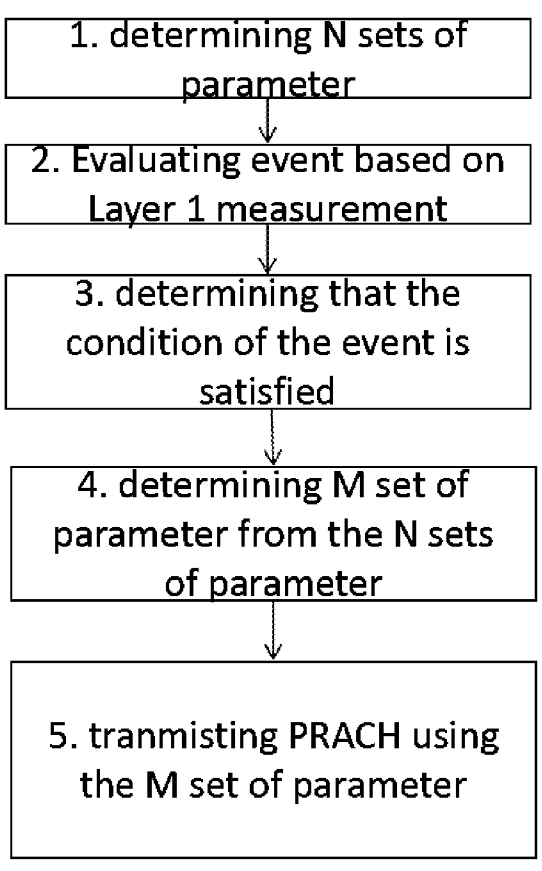
FIG. 9 illustrates a flowchart of a method for transmitting a PRACH according to M sets of parameters selected by a UE in response to an event happening, in accordance with some embodiments.

FIG. 9 illustrates a flowchart of a method for transmitting a PRACH according to M sets of parameters selected by a UE in response to an event happening, in accordance with some embodiments. As shown in FIG. 9, in some embodiments, the UE determines the N sets of parameters. In some embodiments, N is larger than or equal to 1. In some embodiments, the UE evaluates the event based on a Layer 1 measurement. In some embodiments, in response to the condition of the event being satisfied, the UE determines M sets of parameters from the N sets of parameters and transmits PRACH according to the M sets of parameters. In some embodiments, M is larger than or equal to 1 as shown in FIG. 9.

In some implementations, the M sets of parameters includes at least one of a parameter of a synchronization signal, a parameter used to get the mapping relationship between a synchronization signal resource and a PRACH resource, a C-RNTI, a parameter of a synchronization signal, a parameter of a slot structure, a physical cell index, a frequency resource parameter of a carrier, a DMRS parameter, a power control parameter, a PDCCH configuration, a PDSCH configuration, a PUCCH configuration, a TCI state configuration, a spatial relation configuration, a PRACH configuration, an LTE CRS configuration, a TA parameter, a frequency resource parameter corresponding to the one set of parameters a time resource parameter corresponding to the one set of parameters a path loss reference parameter, a BWP parameter, a beam failure parameter, a SIB configuration, a parameter of common control information, or a HARQ feedback parameter.

In some implementations, the Layer 1 measurement includes a PHY layer measurement. For example, in some embodiments, the Layer 1 measurement (or layer 1 measurement result) includes at least one of an L1-RSRP, an L1-RSRQ, an L1-SINR, or a BLER.

In some embodiments, the condition of the event includes one of (1) a layer 1 measurement result of M measurement reference signal groups becoming better than layer 1 measurement result of measurement reference signal groups associated with the old set of parameter, (2) layer 1 measurement result of measurement reference signal groups associated with the old set of parameters becoming/being worse than the threshold1 and a layer 1 measurement result of M measurement reference signal groups becoming/being better than the threshold2, wherein M is larger than 1, (3) a layer 1 measurement result of M measurement reference signal groups becoming/being better than the threshold2, wherein M is larger than 1, or (4) a condition indicating an expiration of a timer.

In some embodiments, the UE reports CSI (e.g., a second CSI) in a msg (e.g., a second msg) transmitted during PRACH process. In some embodiments, the CSI includes at least one of (1) one or more cell indexes, (2) a measurement result of each cell of the one or more cell indexes, (3) one or more reference signal resource indexes, (4) a number of the one or more cell indexes, (5) one or more reference signal resource indexes for each cell, (6) a measurement result of each of the one or more reference signal resource indexes, or (7) a number of the one or more reference signal resource indexes.

In some implementations, the cell index includes at least one of a PCI index, a serving cell index, or an index of parameter set. In some embodiments, one parameter set corresponds to one cell. In some implementations, the reference signal resource index includes at least one of an synchronization signal block (SSB) index, a CSI-RS resource index, an SSB resource indication SSB-RI. In some implementations, the measurement result includes at least one of an RSRP, an RSRQ, an SINR, or a channel quality indicator (CQI).

In some implementations, one cell corresponds to at least one of one PCI, a frequency resource configuration of a synchronization signal corresponding to the one PCI, a subcarrier space synchronization signal, or a serving cell. In some embodiments, when one cell corresponds to one PCI and the measurement includes PCI index and without frequency and sub-carrier spacing information, the frequency resource and the subcarrier space are same for the one or more PCIs reported in the channel state information.

In some implementations, the one or more reference signal resource indexes are for one of the one or more cell indexes. In some embodiments, the UE reports one or more reference signal indexes (e.g., indices) for each of the one or more cell indexes. In some implementations, the reported PCI or cell index is selected from N predefined cells. In some implementations, the msg including the channel state information CSI is at least one of a msg3 of a PRACH process or a msgA of a PRACH process.

In some implementations, the UE determines the reporting parameter for the CSI reporting included in the msg. In some embodiments, the reporting parameter includes at least one of channel measurement reference signal (CMR) parameter, information about reporting quantity, or a reporting resource. In some embodiments, the UE obtains reported CSI information based on the CMR and/or the information about reporting quantity. In some embodiments, the information about reporting quantity includes the information type included in the reported CSI information. In some embodiments, the information type included in the reported CSI information includes at least one of the type of measurement result for the reference signal resource index or the cell index, the number of the reported cell indexes, the number of the reported resource indexes, the number of the reported resource indexes per reported cell, the maximum number of the reported cell indexes, the maximum number of the reported resource indexes, or the maximum number of the reported resource indexes per reported cell. In some embodiments, the type of measurement result includes at least one of an RSRP, an RSRQ, an SINR, or a CQI. In some embodiments, the UE obtains the reporting parameter according at least one of a system information, a rule, or an indication from the msg2. For example, in some embodiments, the system information can indicate Z sets of reporting parameters, the msg2 indicates one of the Z sets of reporting parameters. In some embodiments, the reporting parameter is a fixed value. In some embodiments, the reporting resource includes a PUSCH resource index, and/or a PUCCH resource index. In some embodiments, the CMR channel measurement reference signal (CMR) parameter includes a set of cell index and/or a set of reference signal resource indexes. In some embodiments, the UE obtains the CSI information in the msg base on the set of cell index and/or a set of reference signal resource indexes. In some embodiments, the reference signal resource includes an SSB resource and/or a CSI-RS resource.

In some implementations, the CSI information is reported in msg3 (e.g., the second msg) and includes SSB resource index. In some embodiments, if the SSB index reported in the msg3 is different from the reported SSB index in msg1/msgA (e.g., the first msg), the UE determines which SSB index should be used to get the parameter of a channel or signal. Alternatively, the UE can determine which SSB index should be used to obtain the parameter of a channel or signal regardless the relationship between the SSB index reported in msg1/msgA and in msg3. In some embodiments, the SSB index is a quasi co-location reference signal (QCL-RS) of a downlink channel/signal and/or is used to determine the transmitting filter of an uplink channel/signal.

The UE can obtain/determine the QCL-RS and/or the transmitting filter according to at least one of following multiple methods. In some embodiments of a first method, the UE can still get/determine the QCL-RS and/or the transmitting filter according to the SSB index reported in the msg1/msgA after reporting the CSI in the msg3. In some embodiments, the UE still obtains a monitoring occasion of the CORESET 0 according to the SSB index reported in the msg1/msg A after reporting the CSI in the msg3. In some embodiments of a second method, the UE can obtain the QCL-RS and/or the transmitting filter according to both the SSB index reported in the msg1/msgA and the SSB index reported in the msg3. In some embodiments, one channel/signal corresponds to more than one SSB index including the SSB index reported in the msg1/msgA and the SSB index reported in the msg3. In some embodiments, the DMRS CORESET 0 is QCL-ed with the more than one SSB index. In some embodiments, the UE obtains a monitoring occasion of the CORESET 0 according to the more than one SSB index.

In some embodiments of a third method, the UE can update the QCL-RS and/or the transmitting filter from the SSB index reported in the msg1/msgA, to the SSB index reported in the msg3 after reporting the msg3. In some embodiments, the SSB index reported in the msg3 and the SSB index in the msg1/msgA is associated with one cell. In some embodiments, the UE determines a monitoring occasion of CORESET 0 after msg3 according to the SSB index reported in the msg3 after reporting the msg3. In some embodiments, the UE obtains the monitoring occasion of the CORESET 0 according to the more than one SSB index even if QCL-RS of other downlink channel/signal is obtained according to the SSB index in the msg3.

In some embodiments of a fourth method, the SSB reported in msg1/msgA and msg3 are mapped to different TCI/SRI codepoints. In some embodiments, the DCI from gNB indicates one codepoint indication for the uplink channel/signal and/or downlink channel/signal. The UE can obtain the QCL-RS and/or the transmitting filter according to the codepoint indication. In some embodiments, one codepoint is mapped to a QCL-RS and/or the transmitting filter parameter. In some embodiments, the DCI 0_0 includes a sounding reference indication (SRI) field to indicate the one or more SSB s for the uplink channel/signal. The DCI 1_0 can include a TCI field to indicate the one or more SSBs for the downlink channel/signal.

In some embodiments, the UE determines which of the number of methods (e.g., the first method, the second method, the third method, and the fourth method) to adopt according to a signaling received from the base station or another UE. In some embodiments, the UE determines the QCL-RS and/or the transmitting filter according to at least one of the above multiple methods described, until the UE receives a dedicated configuration/RRC configuration for the QCL-RS/transmitting filter.

In some embodiments, the PCI reported in the msg1/msgA and the msg3 may be different. The UE can obtain the PCI for the channel/signal according to at least one of the above multiple methods. The PCI is used to generate a sequence for the signal or a scrambling sequence for the channel. In some embodiments, the UE determines whether to report the CSI in a msg of PRACH according to at least one of system information or information in msg2.

In the above description, the UE can report a first CSI information in msg 1 and reports a second CSI in msg A, and then the above process can also be applied.

In some embodiments, the UE applies M sets of parameters. In some embodiments, M is larger than 1. In some embodiments, each of the M sets of parameters corresponds to one link.

In some implementations, any one of the M sets of parameters includes one or more following parameters: a parameter of synchronization signal, a parameter of slot structure, a physical cell index, a frequency resource parameter of a carrier, a DMRS parameter, a measurement reference signal parameter, a rate mating parameter, a sub-carrier space, a power control parameter, a PDCCH configuration, a PDSCH configuration, a PUCCH configuration, a TCI state configuration, a spatial relation configuration, a PRACH configuration, a C-RNTI configuration, an LTE CRS configuration, a TA parameter, a frequency resource parameter corresponding to the one set of parameters a time resource parameter corresponding to the one set of parameters, a path loss reference parameter, a BWP parameter, a beam failure parameter, a SIB configuration, a parameter of common control information, or a HARQ feedback parameter.

In some implementations, the frequency (e.g., range of frequencies) of the M sets of parameters overlaps in one frequency range. In some embodiments, the one frequency range includes one of one BWP, one serving cell, one band, or one frequency range. In some embodiments, the UE is to maintain M links with M communication points in the one frequency range. In some embodiments, the UE cannot transmit and receive simultaneously in the one frequency range. In some embodiments, if each of the M sets of parameters includes a respective configuration or value of a slot structure, some restriction or priority should be defined. For example, in some embodiments, the M sets of parameters cannot include a conflicting configuration for a same OFDM. In some embodiments, the conflicting configuration includes a downlink and an uplink. In some embodiments, if the type of the same OFDM is downlink according to one of the M sets of parameters, but the type of the same OFDM is uplink/downlink according to another one of the M sets of parameters, then the configurations of the two sets of parameter conflict. In some implementations, when the OFDM type configuration of the M sets of parameters conflicts, one of the M sets of parameters has a higher priority.

In some implementations, only one of the M sets of parameters includes the configuration of the slot structure. In some embodiments, the UE determines the slot structure according to one of the M sets of parameters even if other set(s) of the M sets of parameters includes the configuration of the slot structure.

Figure 10:
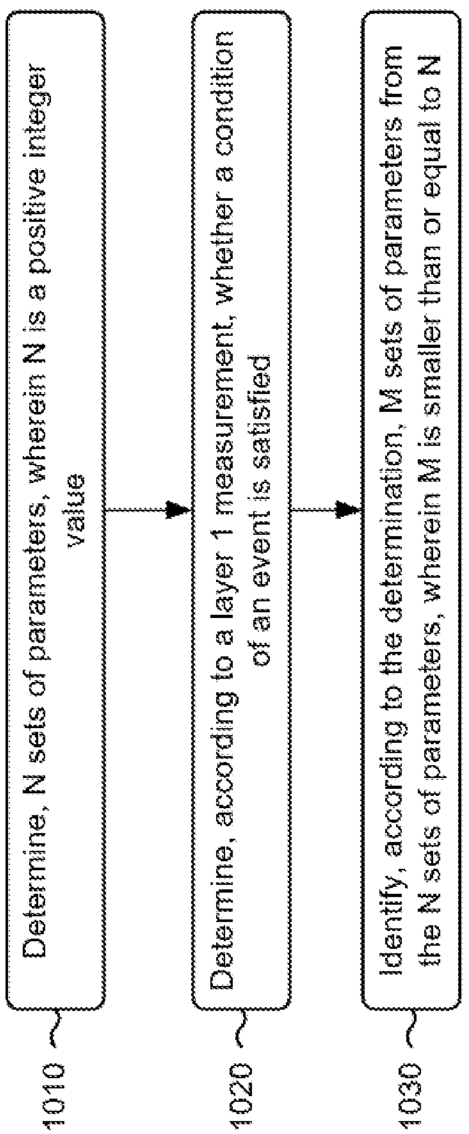
FIG. 10 illustrates a method of identifying, using a layer 1 measurement, M sets of parameters, in accordance with some embodiments.

FIG. 10 illustrates a method 1000 of identifying, using a layer 1 measurement, M sets of parameters, in accordance with some embodiments. Referring to FIGS. 1-9, the method

1000 can be performed by a wireless communication device (e.g., a UE) and/or a wireless communication node (e.g., base station, a gNB), in some embodiments. Additional, fewer, or different operations may be performed in the method 1000 depending on the embodiment.

In brief overview, in some embodiments, a wireless communication device determines N sets of parameters (operation 1010). In some embodiments, the wireless communication device determines, according to a layer 1 measurement, whether a condition of an event is satisfied (operation 1020). In some embodiments, the wireless communication device identifies, according to the determination, M sets of parameters from the N sets of parameters (operation 1030).

In more detail, at operation 1010, in some embodiments, the wireless communication device determines N sets of parameters. In some embodiments, N is a positive integer value. In some embodiments, the wireless communication device is a UE. In some embodiments, the N sets of parameters corresponds to one serving cell. In some embodiments, each set of the N sets of parameters is associated with at least one of one bandwidth part (BWP), one control resource set (CORESET) pool, one group of transmission configuration indicator (TCI) states, one group of reference signals, one serving cell, one group of serving cells, one supplementary link, one combination of the one physical cell index (PCI) and one piece of frequency information, or one combination of the one PCI, one piece of frequency information, and one piece of sub-carrier spacing. In some embodiments, the wireless communication receives first signaling that includes a configuration of X sets of parameters. In some embodiments, X is a positive integer value which is larger than or equal to N. In some embodiments, the wireless communication receives second signaling including an indication for indicating the N sets from the X sets of parameters.

In some embodiments, determining the N sets of parameters includes determining, by the wireless communication device, the N sets of parameters according to an activated transmission configuration indicator (TCI) state of a physical downlink shared channel (PDSCH) or physical downlink control channel (PDCCH). In some embodiments, determining the N sets of parameters includes determining, by the wireless communication device, the N sets of parameters according to information (e.g., channel state information (CSI)) reported by the wireless communication device. In some embodiments, the N sets of parameters satisfy at least one of each of the N sets of parameters includes a same value of a first type of parameter, each of the N sets of parameters includes a second type of parameter or each of C sets of the N sets includes a fourth type of parameter, wherein C is smaller than N.

In some embodiments, a set of the N sets of parameters and/or the first set of parameters includes at least one of a parameter of a synchronization signal, a parameter of a slot structure, a physical cell index (PCI), a parameter indicating frequency resource of a carrier, a demodulation reference signal (DMRS) parameter, a measurement reference signal parameter, a rate matching parameter, a sub-carrier spacing parameter, a power control parameter, a physical downlink control channel (PDCCH) configuration, a physical downlink shared channel (PDSCH) configuration, a physical uplink control channel (PUCCH) configuration, a transmission configuration index (TCI) state configuration, a spatial relation configuration, a physical random access channel (PRACH) configuration, a parameter used to get the mapping relationship between a synchronization signal resource and a PRACH resource, a cell radio network temporary identifier (C-RNTI) configuration, a long term evolution (LTE) cell specific reference signal (CRS) configuration, a timing advance (TA) parameter, a frequency resource parameter corresponding to one set of the N set of parameters, a time resource parameter corresponding to one set of the N set of parameters, a path loss reference parameter, a bandwidth part (BWP) parameter, a beam failure parameter, a system information block (SIB) configuration, a parameter of common control information, or a hybrid automatic request (HARD) feedback parameter.

At operation 1020, in some embodiments, the wireless communication device determines, according to a layer 1 measurement, whether a condition of an event is satisfied. In some embodiments, the condition of the event includes one of (a) a layer 1 measurement result of Y measurement reference signal groups is better than a layer 1 measurement result of a first measurement reference signal group (e.g., associated with a prior/old set of parameters), (b) a layer 1 measurement result of the measurement reference signal groups is worse than a first threshold, and the layer 1 measurement result of the Y measurement reference signal groups is better than a second threshold, (c) the layer 1 measurement result of the Y measurement reference signal groups is better than the second threshold, or (d) expiration of a specific timer. In some embodiments, Y is equal to or larger than 1. In some embodiments, the first measurement reference signal group includes more than one group, each of which is associated with a corresponding first set of parameters (e.g., an old or prior set of parameters).

At operation 1030, in some embodiments, the wireless communication device identifies, according to the determination, M sets of parameters from the N sets of parameters. In some embodiments, M is smaller than or equal to N. In some embodiments, the wireless communication device determines to maintain or to suspend (e.g., ignore, inactivate, purge, bypass, etc.) a first set of parameters while the wireless communication device applies the M sets of parameters. In some embodiments, the wireless communication switches from the first set to the M sets of parameters or applies the first set and the M sets. In some embodiments, the wireless communication device determines to maintain or to suspend the first set of parameters according to at least one of a received signaling or capability information reported by the wireless communication device.

In some embodiments, applying the first set and the M sets includes at least one of (a) determining, by the wireless communication device, a third type of parameter according to one of the M sets of parameters and the first set, even if both of the M sets and the first set include the third type of parameter, (b) determining, by the wireless communication device, that a configuration of the third type of parameter between the M sets of parameters and the first set satisfies at least one restriction, wherein the M sets of parameters and the first set both include the configuration of the third type of parameter, (c) determining, by the wireless communication device, that either the M sets of parameters, or the first set, includes the third type of parameter, determining, by the wireless communication device, that the M sets include the first type of parameter, and that the first set includes the first type of parameter, (d) determining, by the wireless communication device, that the M sets or the first set includes a second type of parameter, (e) determining, by the wireless communication device, that the M sets and the first set include a same value of a first type of parameter, (f) determining, by the wireless communication device, that the M sets and the first set includes a second type of parameter, or (g) determining, by the wireless communication device, that either the M sets or the first set include a fourth type of parameter.

In some embodiments, identifying the M sets of parameters includes identifying, by the wireless communication device, the M sets of parameters from the N sets of parameters, according to the layer 1 measurement. In some embodiments, identifying the M sets of parameters includes identifying/determining/selecting, by the wireless communication device, the M sets of parameters from the N sets of parameters, according to received signaling.

In some embodiments, at least one of (a) each of the Y measurement reference signal groups is associated with one of the M sets of parameters, wherein Y is smaller than or equal to M, (b) each of the Y measurement reference signal groups is associated with one of the N sets of parameters, wherein Y is smaller than or equal to N, or (c) the first measurement reference signal group is associated with a first set of parameters (e.g., an old or prior set of parameters).

In some embodiments, the wireless communication device determines at least one of (a) a third type of parameter according to one of the M sets of parameters, even if all of the M sets include the third type of parameter, (b) that a configuration of the third type of parameter between the M sets of parameters satisfies at least one restriction, wherein all of the M sets of parameter include the configuration of the third type of parameter, or (c) that only one of the M sets of parameters includes the third type of parameter. In some embodiments, the third type of parameter includes a slot structure.

In some embodiments, the wireless communication device performs at least one of (a) according to the M sets of parameters, a first transmission or reception, (b) according to the M sets of parameters, the first transmission or reception, and a second transmission, (c) according to the M sets of parameters, the second transmission, or (d) according to a first set of parameters, the second transmission. In some embodiments, the second transmission includes at least one of a transmission of a physical random access channel (PRACH), a transmission of a scheduling request (SR) or a transmission of a medium access control-control element (MAC-CE).

In some embodiments, performing, according to the M sets of parameters, the second transmission, further includes performing, by the wireless communication device, the first transmission or reception after receiving a response to the second transmission. In some embodiments, performing, according to the first set of parameters, the second transmission, further includes at least one of (a) performing, by the wireless communication device, the first transmission or reception after receiving a response to the second transmission, or (b) identifying, by the wireless communication device, the M sets of parameters according to the response to the second transmission.

In some embodiments, the wireless communication device determines a reporting parameter. In some embodiments, the wireless communication device determines a second channel state information. In some embodiments, the wireless communication device reports, according to the reporting parameter, the second channel state information in a second message (msg) transmitted during a physical random access channel (PRACH) process. In some embodiments, the wireless communication device determines a parameter of a channel or signal according to the second channel state information.

In some embodiments, the wireless communication device transmits a first channel state information reported in a first msg of the PRACH process. In some embodiments, the wireless communication device determines a third channel state information using (or based on, or according to) at least one of the first channel state information or the second channel state information. In some embodiments, the wireless communication device determines a parameter of a channel or signal according to the third channel state information. In some embodiments, the third channel state information includes one of the first channel state information, the second channel state information, or the first channel state information and the second channel state information.

In some embodiments, the wireless communication device transmits a first channel state information reported in a first msg of the PRACH process. In some embodiments, the wireless device at least one of (a) determines a parameter of a channel or signal (e.g., only) according to the first channel state information, after the second msg, (b) determines the parameter of the channel or signal according to both of the first channel state information and the second channel state information, after the second msg, (c) switches the parameter of the channel or signal associated with the first channel state information to the parameter of the channel or signal associated with the second channel state information, after the second msg, or (d) maps the first channel state information and the second channel state information to different codepoints of a downlink control information (DCI), after the second msg, and determines the parameter of the channel or signal according to a codepoint indication in the DCI, wherein the codepoint is mapped to one parameter of the channel or signal.

Figures 11, 12, 13:
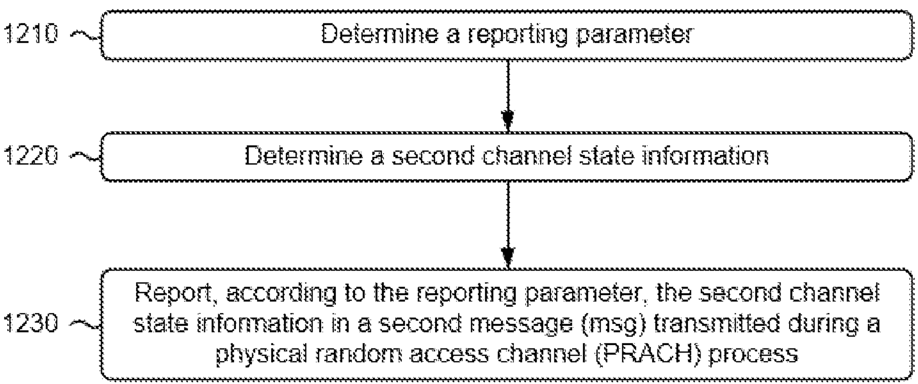
FIG. 11 illustrates a method of transmitting a signaling including N sets of parameters, in accordance with some embodiments.
FIG. 12 illustrates a method of reporting second channel state information in a second msg of a PRACH process according to a reporting parameter, in accordance with some embodiments.
FIG. 13 illustrates a method of receiving second channel state information in a second msg of a PRACH process, in accordance with some embodiments.

FIG. 11 illustrates a method 1100 of transmitting a signaling including N sets of parameters, in accordance with some embodiments. Referring to FIGS. 1-9, the method 1100 can be performed by a wireless communication device (e.g., a UE), and/or a wireless communication node (e.g., base station, a gNB), in some embodiments. Additional, fewer, or different operations may be performed in the method 1100 depending on the embodiment.

At operation 1110, in some embodiments, a first wireless communication node transmits, a signaling including N sets of parameters, to a wireless communication device. In some embodiments, N is a positive integer value. In some embodiments, the wireless communication device is a UE and the first wireless communication node is a gNB.

In some embodiments, a second wireless communication node determines P sets of parameters. In some embodiments, the second wireless communication node monitors a second transmission from the first wireless communication device, according to the P sets of parameters. In some embodiments, the second wireless communication node is the same as or different from the first wireless communication node. In some embodiments, P is an integer smaller than or equal to N, or smaller than or equal to a predefined positive integer value M, wherein the N sets of parameters includes the P sets of parameters.

In some embodiments, the second wireless communication node transmits a response to the received second transmission to the wireless communication device. In some embodiments, the second wireless communication node communicates with the wireless communication device according to the P sets of parameters. In some embodiments, the second wireless communication node transmits information about the P sets of parameters, to the first wireless communication node.

FIG. 12 illustrates a method 1200 of reporting second channel state information in a second msg of a PRACH process according to a reporting parameter, in accordance with some embodiments. Referring to FIGS. 1-9, the method 1200 can be performed by a wireless communication device (e.g., a UE) and/or a wireless communication node (e.g., base station, a gNB), in some embodiments. Additional, fewer, or different operations may be performed in the method 1200 depending on the embodiment.

In brief overview, in some embodiments, a wireless communication device determines a reporting parameter (operation 1210). In some embodiments, the wireless communication device determines a second channel state information (operation 1220). In some embodiments, the wireless communication device reports, according to the reporting parameter, the second channel state information in a second message (msg) transmitted during a physical random access channel (PRACH) process (operation 1230).

In more detail, at operation 1210, in some embodiments, a wireless communication device determines a reporting parameter. In some embodiments, the wireless communication device is a UE. In some embodiments, the reporting parameter includes at least one of a channel measurement reference signal CMR parameter, information about reporting quantity or a reporting resource. In some embodiments, the information about reporting quantity includes a type of information included in the second channel state information.

At operation 1220, in some embodiments, the wireless communication device determines a second channel state information. In some embodiments, the wireless communication device determines a parameter of a channel or signal according to the second channel state information. In some embodiments, the parameter of the channel or signal includes a quasi co-location reference signal (QCL-RS), a transmitting filter, a sequence of the signal, a scrambling sequence of the channel, or a monitoring occasion of control resource set 0 (CORESET0).

At operation 1230, in some embodiments, the wireless communication device reports, according to the reporting parameter, the second channel state information in a second message (msg) transmitted during a physical random access channel (PRACH) process. In some embodiments, the wireless communication device determines the reporting parameter according to at least one of system information, a rule, an indication from a received msg of the PRACH process, or a fixed or predefined value.

In some embodiments, the wireless device at least one of (a) determines a parameter of a channel or signal only according to the first channel state information, (b) determines the parameter of the channel or signal according to both of the first channel state information and the second channel state information, (c) switches the parameter of the channel or signal associated with the first channel state information to the parameter of the channel or signal associated with the second channel state information, or (d) maps the first channel state information and the second channel state information to different codepoints of a downlink control information (DCI), after reporting the second msg.

In some embodiments, the wireless communication device transmits a first channel state information reported in a first msg of the PRACH process. In some embodiments, the wireless communication device determines a third channel state information based on at least one of the first channel state information or the second channel state information. In some embodiments, the wireless communication device determines a parameter of a channel or signal according to the third channel state information. In some embodiments, the third channel state includes one of the first channel state information, the second channel state information, or the first channel state information and the second channel state information.

In some embodiments, the first channel state information reported in the first msg of the PRACH process includes at least one of a resource index or a physical cell identifier (PCI) index reported in msg 1 or msg A. In some embodiments, the resource index includes at least one of a CSI reference signal (CSI-RS) resource indication (CRI), a synchronization signal block (SSB) resource indication (SSB-RI), or a SSB index. In some embodiments, the resource index in the msg1 is reported implicitly by transmitting a preamble in a PRACH occasion associated with the resource index. In some embodiments, (a) the parameter of the channel or signal is determined after reporting the second msg and/or (b) the first channel state information is different from the second channel state information.

In some embodiments, the wireless communication device determines at least one of (a) that downlink control information (DCI) 0_0 includes a sounding reference indication (SRI) field or (b) that DCI 1_0 includes a transmission configuration indicator (TCI) field. In some embodiments, the wireless communication device determines at least one (a) that downlink control information (DCI) 0_0 includes a sounding reference indication (SRI) field according to a first received information or (b) that DCI 1_0 includes a transmission configuration indicator (TCI) field according to a second received information. In some embodiments, at least one of the first received information or the second received information, include at least one of system information, or information on whether the wireless communication device will report the second channel state information in the second msg. In some embodiments if the wireless communication device is to report the second channel state information in the second msg, the wireless communication device determines at least one of (a) that the DCI 0_0 includes the SRI field or (b) that the DCI 1_0 includes the TCI field.

In some embodiments, the codepoints of the downlink control information includes one of a transmission configuration indicator (TCI) codepoint of downlink control information (DCI) 1_0, or a sounding reference indication (SRI) codepoint of DCI 0_0. In some embodiments, at least one of the second channel state information or the first channel state information, includes at least one of at least one cell index, a measurement result of each cell of the at least one cell index, at least one reference signal resource index, a number or count of the at least one cell index, at least one reference signal resource index for each cell of the at least one cell index, a number of the at least one reference signal resource index for each cell of the at least one cell index, a measurement result of each of the at least one reference signal resource index, or a number of the at least one reference signal resource index for each cell of the at least one cell index. In some embodiments, each of the at least one the reference signal resource index includes at least one of a CSI reference signal (CSI-RS) resource indication (CRI), a synchronization signal block (SSB) resource indication (SSB-RI), or a SSB index.

In some embodiments, the second msg includes: msg3 or msgA of the PRACH process. In some embodiments, the wireless communication node causes the wireless communication device to determines whether to report the second channel state information in the second msg according to at least one of system information, or information in msg2.

FIG. 13 illustrates a method 1300 of receiving second channel state information in a second msg of a PRACH process, in accordance with some embodiments. Referring to FIGS. 1-9, the method 1300 can be performed by a wireless communication device (e.g., a UE) and/or a wireless communication node (e.g., base station, a gNB), in some embodiments. Additional, fewer, or different operations may be performed in the method 1300 depending on the embodiment.

At operation 1310, a wireless communication node receives, from a wireless communication device, a second channel state information in a second message (msg) of a physical random access channel (PRACH) process. In some embodiments, the wireless communication device is a UE and the wireless communication node is either a gNB or another UE. In some embodiments, the wireless communication node transmits, to the wireless communication device, a reporting parameter, via at least one of system information or a msg of the PRACH process. In some embodiments, the reporting parameter includes at least one of a channel measurement reference signal CMR parameter, information about reporting quantity, or a reporting resource. In some embodiments, the information about reporting quantity includes a type of information included in the second channel state information. In some embodiments, the wireless communication device determines a parameter of a channel or signal according to the second channel state information.

In some embodiments, the wireless communication node receives, from the wireless communication device, a first channel state information in a first msg of the PRACH process. In some embodiments, the wireless communication node determines whether the first channel state information is different from the second channel state information. In some embodiments, the wireless communication node determines whether to use the first channel state information or the second information to determine a parameter of a channel or signal communicated with the wireless communication device.

In some embodiments, when the first channel state information is different from the second channel state information, the wireless node at least one of (a) determines a parameter of a channel or signal only according to the first channel state information, (b) determines the parameter of the channel or signal according to both of the first channel state information and the second channel state information, (c) switches from a parameter of the channel or signal associated with the first channel state information, to a parameter of the channel or signal associated with the second channel state information, or (d) maps the first channel state information and the second channel state information to different codepoints of a downlink control information (DCI), after reporting the second msg.

In some embodiments, the wireless communication node receives a first channel state information reported in a first msg of the PRACH process. In some embodiments, the wireless communication node determines a third channel state information using the first channel state information and the second channel state information. In some embodiments, the wireless communication node determines a parameter of a channel or signal according to the third channel state information. In some embodiments, the third channel state information includes one of the first channel state information, the second channel state information, or the first channel state information and the second channel state information.

In some embodiments, the first channel state information reported in the first msg of the PRACH process comprises at least one of a resource index or a physical cell identifier (PCI) index reported in msg 1 or msg A. In some embodiments, the resource index includes at least one of a CSI reference signal (CSI-RS) resource indication (CRI), a synchronization signal block (SSB) resource indication (SSB-RI), or a SSB index. In some embodiments, the resource index in the msg1 is reported implicitly by transmitting a preamble in a PRACH occasion associated with the resource index. In some embodiments, the parameter of the channel or signal includes: a quasi co-location reference signal (QCL-RS), a transmitting filter, a sequence of the signal, a scrambling sequence of the channel, or a monitoring occasion of control resource set 0 (CORESET0). In some embodiments, at least one of: the parameter of the channel or signal is determined after reporting the second msg, the channel or signal is sent by the wireless communication node to the wireless communication device, or the channel or signal is received by the wireless communication node from the wireless communication device, or the first channel state information is different from the second channel state information.

In some embodiments, the wireless communication node transmits, to the wireless communication device, at least one of (a) a downlink control information (DCI) 0_0 with a sounding reference indication (SRI) field or (b) a DCI 1_0 with a transmission configuration indicator (TCI) field. In some embodiments, the wireless communication node transmits, to the wireless communication device, a first information which indicates whether at least one of (a) a downlink control information (DCI) 0_0 includes a sounding reference indication (SRI) field according to a first received information or (b) a DCI 1_0 includes a transmission configuration indicator (TCI) field according to a second received information.

In some embodiments, at least one of the first information or the second information, include at least one of system information, information on whether the wireless communication device will report the second channel state information in the second msg. In some embodiments, the wireless communication device is to report the second channel state information in the second msg. In some embodiments, the wireless communication node transmits, to the wireless communication device, at least one of (a) the DCI 0_0 with the SRI field or (b) the DCI 1_0 with the TCI field. In some embodiments, the codepoints of the downlink control information includes one of a transmission configuration indicator (TCI) codepoint of downlink control information (DCI) 1_0, or a sounding reference indication (SRI) codepoint of DCI 0_0.

In some embodiments, at least one of the second channel state information or the first channel state information, includes at least one of at least one cell index, a measurement result of each cell of the at least one cell index, at least one reference signal resource index, a number or count of the at least one cell index, at least one reference signal resource index for each cell of the at least one cell index, a number of the at least one reference signal resource index for each cell of the at least one cell index, a measurement result of each of the at least one reference signal resource index, or a number of the at least one reference signal resource index for each cell of the at least one cell index. In some embodiments, each of the at least one the reference signal resource index includes at least one of a CSI reference signal (CSI-RS) resource indication (CRI), a synchronization signal block (SSB) resource indication (SSB-RI), or a SSB index.

In some embodiments, at least one of the second channel state information or the first channel state information, includes at least one of at least one cell index, a measurement result of each cell of the at least one cell index, at least one reference signal resource index, a number or count of the at least one cell index, at least one reference signal resource index for each cell of the at least one cell index, a number of the at least one reference signal resource index for each cell of the at least one cell index, a measurement result of each of the at least one reference signal resource index, or a number of the at least one reference signal resource index for each cell of the at least one cell index. In some embodiments, each of the at least one the reference signal resource index includes at least one of a CSI reference signal (CSI-RS) resource indication (CRI), a synchronization signal block (SSB) resource indication (SSB-RI), or a SSB index.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as “first,” “second,” and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as “software” or a “software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term “module” as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method comprising:

determining, by a wireless communication device, N sets of parameters, wherein Nis a positive integer value;

determining, by the wireless communication device according to a layer 1 measurement, whether a condition of an event is satisfied;

identifying, by the wireless communication device according to the determination, M sets of parameters from the N sets of parameters, wherein M is smaller than or equal to N, wherein the N sets of parameters satisfy at least one of:

each of the N sets of parameters includes a same value of a first type of parameter;

each of the N sets of parameters includes a second type of parameter; or each of C sets of the N sets includes a fourth type of parameter, wherein Cis smaller than N.

2. The method of claim 1, wherein the N sets of parameters corresponds to one serving cell.

3. The method of claim 1, wherein each set of the N sets of parameters is associated with one of: one control resource set (CORESET) pool, one group of transmission configuration indicator (TCI) states, one group of reference signals, one serving cell, one supplementary link, one combination of one physical cell index (PCI) and one piece of frequency information, or one combination of the one PCI, one piece of frequency information, and one piece of sub-carrier spacing.

4. The method of claim 1, comprising:

determining, by the wireless communication device, to maintain or to suspend a first set of parameters while the wireless communication device applies the M sets of parameters, wherein to maintain or to suspend the first set of parameters comprises one of the following:

switching, by the wireless communication device, from the first set to the M sets of parameters; or applying, by the wireless communication device, the first set and the M sets.

5. The method of claim 4, wherein applying the first set and the M sets comprises at least one of:

determining, by the wireless communication device, a third type of parameter according to one of the M sets of parameters and the first set, even if both of the M sets and the first set include the third type of parameter;

determining, by the wireless communication device, that a configuration of the third type of parameter between the M sets of parameters and the first set satisfies at least one restriction, wherein the M sets of parameters and the first set both include the configuration of the third type of parameter;

determining, by the wireless communication device, that either the M sets of parameters, or the first set, includes the third type of parameter;

determining, by the wireless communication device, that the M sets and the first set include a same value of a first type of parameter;

determining, by the wireless communication device, that the M sets and the first set includes a second type of parameter; or determining, by the wireless communication device, that either the M sets or the first set include a fourth type of parameter.

6. The method of claim 4, comprising:

determining, by the wireless communication device, to maintain or to suspend the first set of parameters according to at least one of: a received signaling or capability information reported by the wireless communication device.

7. The method of claim 1, wherein determining the N sets of parameters comprises:

receiving, by the wireless communication device, first signaling that includes a configuration of X sets of parameters, wherein X is a positive integer value which is larger than or equal to N; and receiving, by the wireless communication device, second signaling including an indication for indicating the N sets from the X sets of parameters.

8. The method of claim 1, wherein determining the N sets of parameters comprises:

determining, by the wireless communication device, the N sets of parameters according to an activated transmission configuration indicator (TCI) state of a physical downlink shared channel (PDSCH) or physical downlink control channel (PDCCH).

9. The method of claim 1, wherein the condition of the event comprises one of:

a layer 1 measurement result of Y measurement reference signal groups is better than a layer 1 measurement result of a first measurement reference signal group;

a layer 1 measurement result of the measurement reference signal groups is worse than a first threshold, and the layer 1 measurement result of the Y measurement reference signal groups is better than a second threshold;

the layer 1 measurement result of the Y measurement reference signal groups is better than the second threshold; or expiration of a specific timer, wherein Y is equal to or larger than 1.

10. The method of claim 9 wherein at least one of:

each of the Y measurement reference signal groups is associated with one of the M sets of parameters, wherein Y is smaller than or equal to M;

each of the Y measurement reference signal groups is associated with one of the N sets of parameters, wherein Y is smaller than or equal to N; or the first measurement reference signal group is associated with a first set of parameters.

11. The method of claim 9, wherein the first measurement reference signal group includes more than one group, each of which is associated with a corresponding first set of parameters.

12. The method of claim 1, when M is larger than 1, the method further comprising at least one of:

determining, by the wireless communication device, a third type of parameter according to one of the M sets of parameters, even if all of the M sets include the third type of parameter;

determining, by the wireless communication device, that a configuration of the third type of parameter between the M sets of parameters satisfies at least one restriction, wherein all of the M sets of parameter include the configuration of the third type of parameter; or determining, by the wireless communication device, that only one of the M sets of parameters includes the third type of parameter.

13. The method of claim 1, further comprising one of:

performing, by the wireless communication device according to the M sets of parameters, a first transmission or reception;

performing, by the wireless communication device according to the M sets of parameters, the first transmission or reception, and a second transmission;

performing, by the wireless communication device according to the M sets of parameters, the second transmission; or performing, by the wireless communication device according to a first set of parameters, the second transmission.

14. The method of claim 1, wherein a set of the N sets of parameters includes at least one of:

a parameter of a synchronization signal, a parameter of a slot structure, a physical cell index (PCI), a parameter indicating frequency resource of a carrier, a demodulation reference signal (DMRS) parameter, a measurement reference signal parameter, a rate matching parameter, a sub-carrier spacing parameter, a power control parameter, a physical downlink control channel (PDCCH) configuration, a physical downlink shared channel (PDSCH) configuration, a physical uplink control channel (PUCCH) configuration, a transmission configuration index (TCI) state configuration, a spatial relation configuration, a physical random access channel (PRACH) configuration, a parameter used to get the mapping relationship between a synchronization signal resource and a PRACH resource, a cell radio network temporary identifier (C-RNTI) configuration, a long term evolution (LTE) cell specific reference signal (CRS) configuration, a timing advance (TA) parameter, a frequency resource parameter corresponding to one set of the N set of parameters, a time resource parameter corresponding to one set of the N set of parameters, a path loss reference parameter, a bandwidth part (BWP) parameter, a beam failure parameter, a system information block (SIB) configuration, a parameter of common control information, or a hybrid automatic request (HARQ) feedback parameter.

15. A wireless communication device, comprising:

at least one processor configured to:

determine N sets of parameters, wherein N is a positive integer value;

determine, according to a layer 1 measurement, whether a condition of an event is satisfied;

identify, according to the determination, M sets of parameters from the N sets of parameters, wherein M is smaller than or equal to N, wherein the N sets of parameters satisfy at least one of:

each of the N sets of parameters includes a same value of a first type of parameter;

each of the N sets of parameters includes a second type of parameter; or each of C sets of the N sets includes a fourth type of parameter, wherein Cis smaller than N.

16. The wireless communication device of claim 15, wherein the at least one processor is further configured to:

determine a reporting parameter;

determine a second channel state information; and report, according to the reporting parameter, the second channel state information in a second message (msg) transmitted during a physical random access channel (PRACH) process.

17. The wireless communication device of claim 16, wherein the at least one processor is further configured to:

determine a parameter of a channel or signal according to the second channel state information.

18. The wireless communication device of claim 16, wherein the at least one processor is further configured to:

transmit a first channel state information reported in a first msg of the PRACH process;

determine a third channel state information according to at least one of the first channel state information or the second channel state information; and determine a parameter of a channel or signal according to the third channel state information, wherein the third channel state information includes one of:

the first channel state information;

the second channel state information; or the first channel state information and the second channel state information.

19. The wireless communication device of claim 16, wherein the at least one processor is further configured to:

transmit a first channel state information reported in a first msg of the PRACH process; and at least one of:

determine a parameter of a channel or signal only according to the first channel state information, after the second msg;

determine the parameter of the channel or signal according to both of the first channel state information and the second channel state information, after the second msg;

switch the parameter of the channel or signal associated with the first channel state information to the parameter of the channel or signal associated with the second channel state information, after the second msg; or map the first channel state information and the second channel state information to different codepoints of a downlink control information (DCI), after the second msg, and determine the parameter of the channel or signal according to a codepoint indication in the DCI, wherein the codepoint is mapped to one parameter of the channel or signal.

20. The wireless communication device of claim 15, wherein the at least one processor is further configured to:

perform, according to the M sets of parameters, a first transmission or reception;

perform, according to the M sets of parameters, the first transmission or reception, and a second transmission;

perform, according to the M sets of parameters, the second transmission; or perform, according to a first set of parameters, the second transmission.

* * * * *